March 28, 1939.  D. A. WEIS ET AL  2,152,296
ADVERTISING DEVICE
Filed Sept. 21, 1936  5 Sheets-Sheet 1
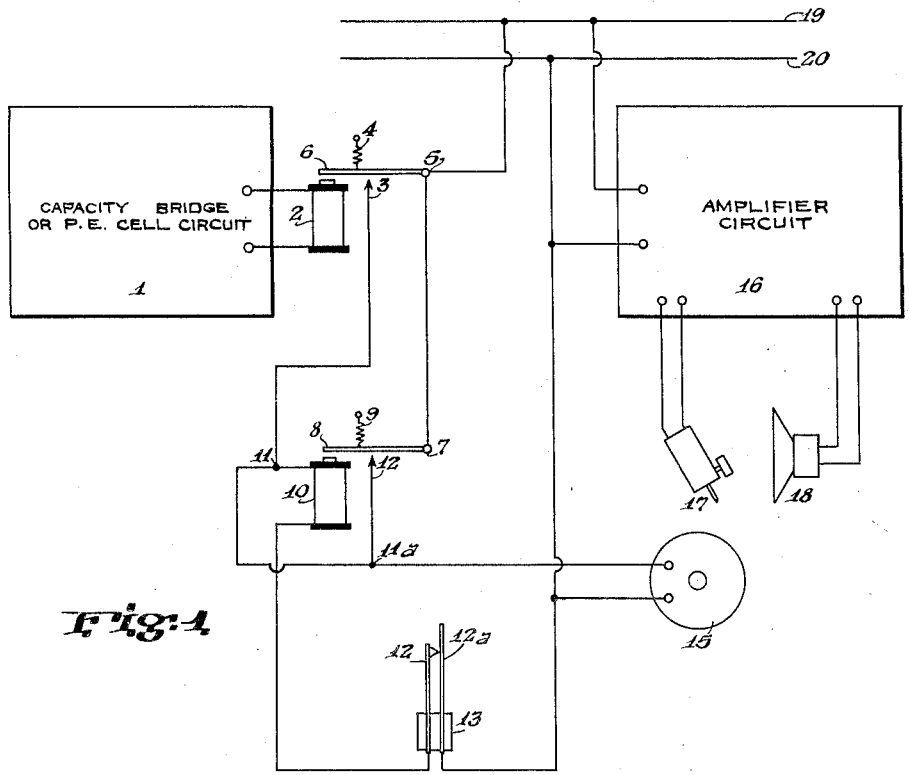
Fig. 1
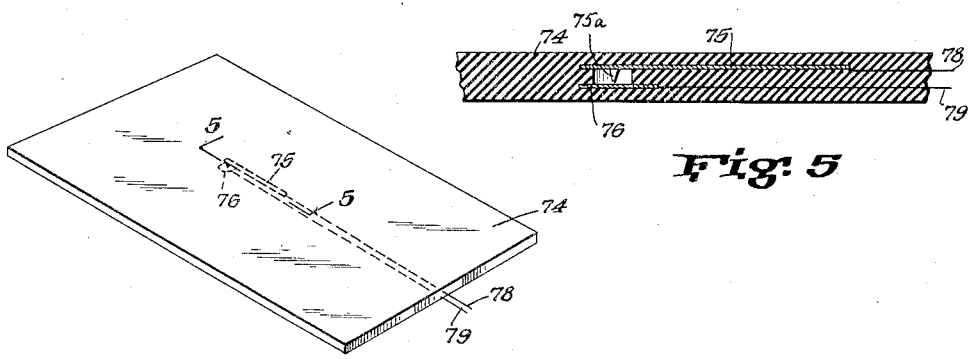
Fig. 5
Fig. 4
INVENTORS
David Albert Weis
William D. Woolf
BY
Ralph B. Stewart
ATTORNEY March 28, 1939.　　　D. A. WEIS ET AL　　　2,152,296
ADVERTISING DEVICE
Filed Sept. 21, 1936　　　5 Sheets-Sheet 2

INVENTORS.
David Albert Weis
William L. Woolf
BY
Ralph B. Stewart
ATTORNEY

March 28, 1939.    D. A. WEIS ET AL    2,152,296
ADVERTISING DEVICE
Filed Sept. 21, 1936    5 Sheets-Sheet 4

INVENTORS
David Albert Weis
William L. Woolf
BY
Ralph B. Stewart
ATTORNEY

March 28, 1939.　　D. A. WEIS ET AL　　2,152,296
ADVERTISING DEVICE
Filed Sept. 21, 1936　　5 Sheets-Sheet 5
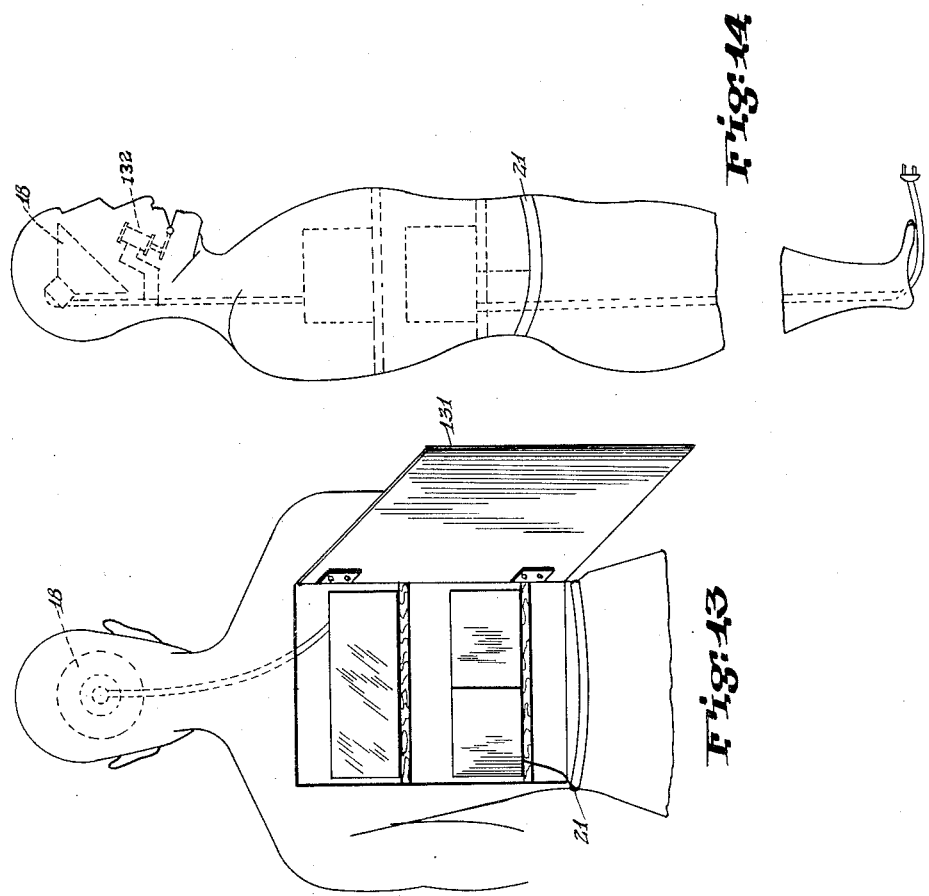
INVENTORS
David Albert Weis
William L. Woolf
BY
Ralph B. Stewart
ATTORNEYS.

Patented Mar. 28, 1939

2,152,296

UNITED STATES PATENT OFFICE 2,152,296

ADVERTISING DEVICE

David Albert Weis and William L. Woolf, New York, N. Y., assignors to Talking Advertising Corporation, a corporation of New York Application September 21, 1936, Serial No. 101,834

8 Claims. (Cl. 40—126)

This invention relates to advertising devices, and more particularly to a device by means of which a person, without any voluntary act on his part, closes an electric switch in a circuit, and thereby energizes or sets into operation suitable apparatus to deliver or display advertising information.

The closing of the switch may be made to light a lamp, start in motion an inanimate object, deliver an advertising message or do any one of a number of acts or combinations of acts which may be performed electrically or set into operation by electrical means. The closing of the switch is caused by the mere presence of a person in a certain predetermined position with respect to the machine or an operative part of the machine. Steps are also taken or means added to the machine to induce the person to occupy the predetermined position. The machine may be located by an aisle or pathway where people pass, or a mirror may be added to the machine as a lure, or an animated object, picture, sign or other means may be employed to induce persons to occupy the desired position. Once the person occupies this position he automatically, and without any conscious act on his part so to do, closes the switch. This may be closed by means of a photo-cell relay, or by a capacity operated switch, or by means of a spring switch located in a mat, under a rug or on the floor beneath the person standing on the predetermined position.

Whether a lamp is lighted, whether goods are displayed either through a transparent mirror or otherwise, whether a sign is lighted and a message conveyed visibly, or whether a message is conveyed audibly, or a robot or other object or objects set in motion, this device leaves a very vivid impression due to the elements of surprise and mystery as well as the feeling that the message conveyed, whether audible or visible, is entirely for the particular person at that moment occupying the predetermined position for setting the mechanism in operation.

As above indicated the prime purpose of this invention is to create a novel means of advertising. We are fully aware of the existence of devices which employ certain of the elements of our invention in burglar alarms and the like, but none of these is suitable for the purpose for which we employ our device in that they lack one or more of the essential elements which make our device successful. Most of these devices for instance, give some sort of signal but generally to some person other than the subject causing the mechanism to operate, and the nature of the signal given has no value whatever as a means of creating in the subject the desire to buy. Another element usually lacking is a lure or means of assuring that the subjects, in comparatively large numbers occupy the position which causes the advertising message to be delivered.

It will, of course, be apparent that the use of our device may extend beyond the scope of advertising merchandise. It may advertise an idea and, therefore, be used in propaganda drives or safety campaigns to repeat appropriate slogans or messages; it may be used to replace an attendant in certain positions, the device giving the subject necessary information or instructions.

One element of our invention which is of great importance is the fact that one person only, or at most a very small group of persons, can occupy concurrently the position the occupancy of which causes the device to operate. This feature makes the message very impressive, the subject feeling that the message is personal and directed to him only.

Broadly, our invention involves the following elements:

(A) A lure, or means for inducing or impelling the subject into the location in which his presence causes the apparatus to function.

(B) Automatic mechanism responsive to the presence of the subject in proximity to the lure to cause a switch to close, thus energizing an electric circuit.

(C) Apparatus set into motion or energized upon the closing of the switch for delivering the desired audible or visible message.

(D) Means to assure the repetition of the complete message, starting at its beginning, to the succeeding subject regardless of whether or not the previous subject occupied the predetermined position for tripping the device during the entire period of the preceding message.

For the lure we have found that one of the most universally effective methods of luring a person into the position desired to trip the mechanism and deliver the message is a mirror. We have also employed attractive displays of merchandise, or objects, or in place thereof we have employed pictures, paintings or drawings of the objects, or miniature replicas of large objects, these replicas being made of papier-mâché, Celluloid, wood and the like. We have found that any moving object acts as an effective lure, particularly if the motion presents a mystery problem to the observer. A robot or human figure has proven to have very great appeal to the public, particularly if some portion of it is in motion. Again our device may be located by an aisle or pathway, or a rail may be put up causing people to walk over the desired position, in which event no other lure is necessary.

To perform the functions of element B above, we employ any one of three different types of equipment. The first method employs a photoelectric cell in an appropriate relay circuit. The interruption of a beam of light falling on the cell, effected by a body occupying the predetermined position, causes the mechanism to go into operation. The photo-cell, exciter lamp, amplifier and relay may be referred to as an automatic switch. The second method employs a capacity operated switch. The presence of a person in the predetermined position induces a charge on an antenna, or changes its effective capacity, which causes an oscillating circuit to pass a current through a solenoid, thus closing a switch. For practical reasons it is sometimes desirable to employ two relays, a very sensitive relay to operate a less sensitive one. Whether one or two relays are used, the function of the antenna, capacity operated oscillator and solenoid may be described as that of an automatic switch. The third method employs a switch embedded in a pad under foot of the subject, the weight of the subject causing the switch to close, and a spring or compressed rubber causing the switch to open the moment the weight is removed. This may also be described as an automatic switch. This device is very effective when used on weighing scales. In all the above methods the object is the same, viz., to cause the mere presence of the subject to close a switch without his knowledge or without any conscious cooperation on his part. The switch thus closed introduces electrical energy into the device and causes it to deliver its advertising message whether it be audible or visible.

The element (C) or the apparatus which delivers the message may assume various forms of devices for displaying or delivering either an audible or a visible message. In most instances, the device will be driven by a motor controlled by the automatic switch. If the message is a visible one, the motor may start a device or number of devices in motion. This motion in each instance conveys an unmistakable advertising message to the subject. Or the message may be an audible one recorded on a film, a cylinder, or a piece of magnetic tape. The important feature of this part of the equipment is that the message must be conveyed to the particular subject whose presence brought the equipment into a state of operation and that the message must be unmistakable as a message, and not a mere noise or motion that attracts attention without conveying a definite message.

In each device we provide a means (element D) for setting the equipment in readiness to start the message at its beginning for the next subject who occupies the sensitive area or predetermined position, regardless of whether or not the last subject remained in this position during the entire delivery of the complete message.

Our invention will be more fully understood by reference to the accompanying drawings in which Figure 1 is a schematic drawing showing the arrangements of parts.

Figure 4 is a perspective view of a suitable floor switch; Figure 5 is a section along line 5—5 of Figure 4;

Figure 13 is a rear view of the figure of a man in which our apparatus is placed to increase its advertising effectiveness, and Figure 14 is a side view of Figure 13.

Figure 2:
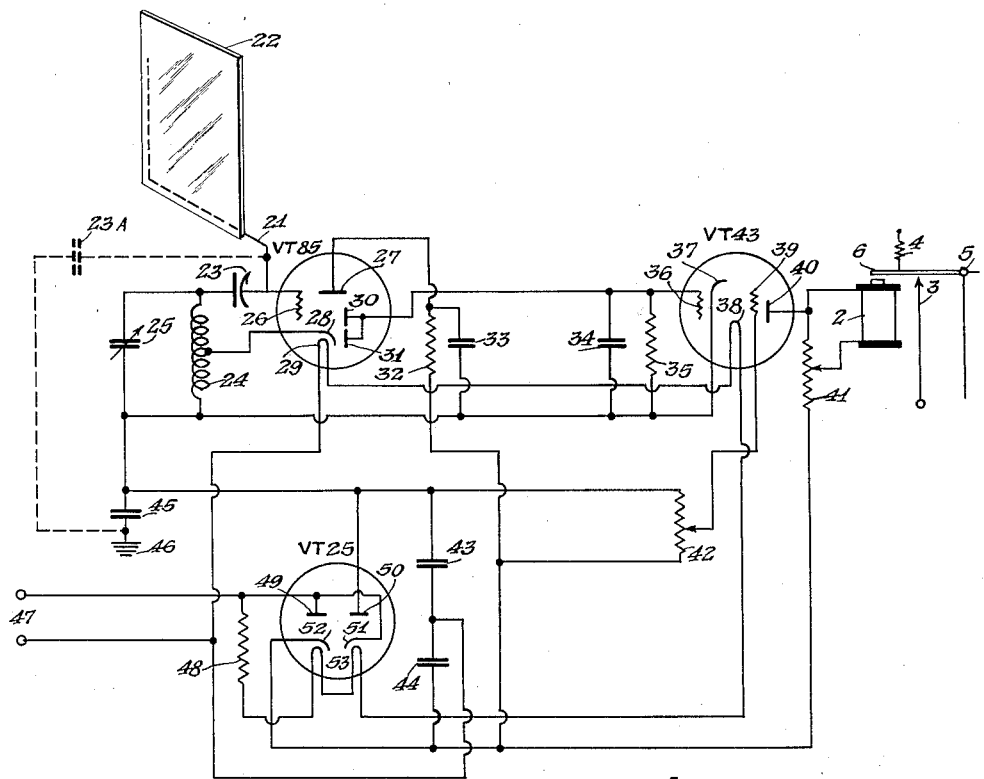
Figure 2 is a schematic drawing showing one embodiment of a capacity operated device suitable for use in this invention and indicating the relationship of the lure (in this instance a mirror) to the antenna.

Referring to Figure 1, the device represented by the rectangle 1 is any one of the embodiments of the automatic switch described under (B) above; that is, 1 may be a photo-cell, device with exciter lamp, amplifier and relay or it may be a capacity sensitive circuit, or a tread switch. In either event, the device represented by 1 is responsive to the presence of a person in the above mentioned predetermined position. In that embodiment in which 1 represents a capacity operated switch this position will be near the aerial of the oscillating circuit. In that embodiment in which 1 is a photo-cell device, it will function when a person stands in the line of a beam of light hereinafter described. In that embodiment in which 1 is a tread switch, the weight of the person standing on it causes the switch to close. In each instance above described the presence of the person causes a current to flow through a solenoid 2 which attracts its armature 6 (hinged at 5 and suspended by the spring 4), thus making contact between the armature 6 and the switch point 3 and thereby closing a circuit permitting current to flow from the supply conductor 19 to the junction point 11, the current thence flows from 11 through the solenoid 10, through switch 13, through motor 15 and back to supply conductor 20. Solenoid 10 attracts its armature 8 (pivoted at 7 and suspended by a spring 9), thus causing armature 8 to make contact with switch point 12. We then have two parallel paths from 5 to 11A, one path being via 5, 3, 11 and 11A and the other path being via 5, 7, 12 and 11A. Should the person leave the sensitized area or predetermined position above described, current will be cut off from solenoid 2 and the spring 4 will disconnect the contact between armature 6 and contact 3, thus breaking one leg of the parallel circuit. Current may continue to flow, however, via 5, 7, 12, 11A, 11 through solenoid 10 thence through switch 13 and to the motor 15, thus continuing the action of the motor even though solenoid 2 ceases to function, as will be the case when the subject leaves the sensitized area. The motor continues in motion until switch 13 is opened by breaking contact of conductor 12 with 12A which is accomplished mechanically as hereinafter described.

The rotation of the motor 15 may be caused to propel a film bearing a recorded message, said message having been recorded either photographically or phonographically, or to propel a magnetized steel tape bearing a magnetically recorded record, or to rotate a cylinder bearing a phonographic record. In addition thereto or in place thereof, the motor may be caused to operate any mechanical device the operation of which clearly and distinctly conveys a visible advertising message directly to the subject at that moment occupying the predetermined position above described.

In the event the motor is caused to operate a phonographic message borne on a cylinder or film, this message will be reproduced by electrical pick-up 17, amplified through the amplifier 16 and reproduced through the loud speaker 18. The speaker may operate alone or may divide its electrical energy with other devices such as motors or solenoids which may cause the motion of devices such as dancing dolls or the motion of the lips of a robot, said motion being synchronized with the sound of the loud speaker.

In Figure 2 a mirror 22 positioned near an aerial 21 acts as a lure. The body capacity of a subject stepping near the mirror 22 changes the effective capacity of the antenna the same as would be the case if a condenser were added as shown at 23A.

The vacuum tube VT85 is connected in an oscillating circuit, the condenser 33 feeding back a portion of the energy of the plate circuit from the plate 27 to the grid 26 through inductance 24 and condenser 23. Condensers 23 and 33 and inductance coil 24 being in series, a tremendously high current will flow at the resonance frequency. A condenser 25 is connected in parallel with the coil 24 and tuned to make the resonance frequency of the parallel circuit 24—25 equal to that of the resonant frequency of circuit 33—24—23. The nature of a parallel resonance circuit is such that it blocks any current at its resonant frequency and substantially no current flows. With the introduction of a third capacity 23A however, the natural frequency of the series oscillating circuit is changed, while that of the parallel circuit remains the same. The tendency in the series circuit thus modified is for the current to rise, and the tendency in the parallel circuit is to cease its blocking effect at the new frequency of the series circuit, hence a large current will flow in tube VT85 to plates 30 and 31 which are tied together in this circuit. This current is rectified in tube VT43 and passed through solenoid 2, thus closing the contact between armature 6 and switch 3 and setting into operation the circuit of Figure 1.

Direct current for the operation of the grid and plate circuits of tubes VT85 and VT43 is supplied from an alternating current circuit 47 through rectifier tube VT25 as clearly shown in Figure 2.

Figure 3:
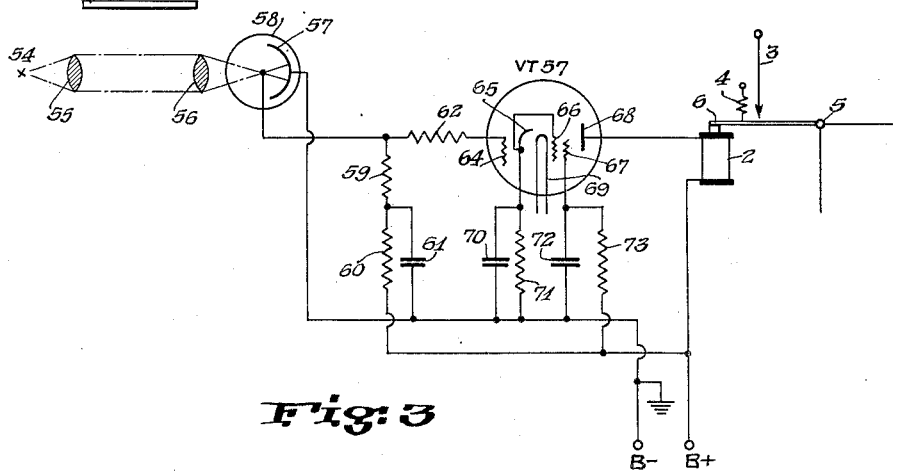
Figure 3 is a circuit diagram of a photo-electric cell and amplifier relay circuit suitable for use in our device.

In Figure 3 the exciter lamp 54 throws a beam of light through the lenses 55 and 56 thence to the photo-electric cell 58, striking the light sensitive plate 57, inducing an electrical change therein which is amplified by the vacuum tube VT57 causing a plate current to flow in the plate 68 through the solenoid 2 and causing the armature 6 to make contact with the solenoid magnet 2, thereby causing an open circuit between contact 3 and armature 6. The exciter lamp 54 and lenses 55 and 56 are arranged near the line (illustrated as a mirror 22) in a position so the light beam between the lenses is interrupted by a person approaching the mirror. If the beam of light is broken by the imposition of an opaque body between exciter lamp 54 and lenses 55, no voltage is generated across the terminals of the photo-cell 58 connected to the grid of the vacuum tube VT57, hence the vacuum tube VT57 discontinues to amplify and no current flows through the solenoid 2 and spring 4 pulls armature 6 against contact 3, thereby closing the circuit to motor 15 as described above in connection with Figure 1.

A rubber floor mat equipped with two metallic conductors forming a switch may be used to simplify the above described apparatus, thus eliminating the capacity operated switch, or the photocell and its amplifier, and closing the switch directly, such a mat and switch being shown in Figure 4, the rubber mat 74 having embodied therein a conductor 75 having a connecting wire 78 and a conductor 76 having a connecting wire 79. The conductors 75 and 76 are normally held in spaced relation by a portion of the rubber mat as shown in Figure 5. A cut-out portion in said mat, however, permits contact 75a carried by conductor 75 to come in contact with conductor 76 when the rubber mat is compressed by imposing a weight thereon. In using the tread switch of Figures 4 and 5, solenoid 2 need not be used and wire 78 would be connected to the point 5 while wire 79 is connected to the point 11 in the circuit of Figure 1. If desired, the relay 2 may be retained and the tread switch arranged to complete the energizing circuit of this relay.

It will be understood that the mat 74 will be placed near the line so that a person approaching the lure will step on the mat and close the switch. The mat may be placed on the platform of a weighing scale in a position so that the weight of a person will close the switch and set off the advertising device.

Figure 6:
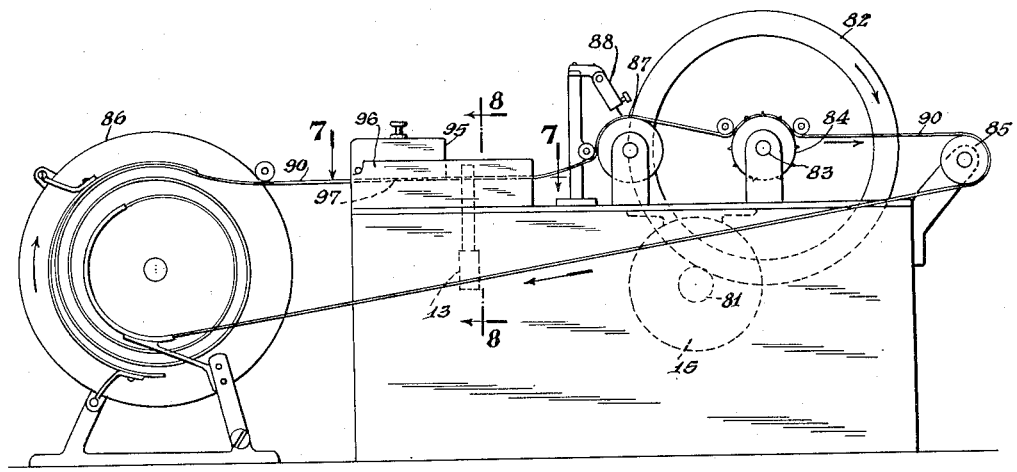
Figure 6 is a fragmentary side view of that embodiment of our invention which employs a sound record recorded in a groove on a continuous film.
Figure 7:
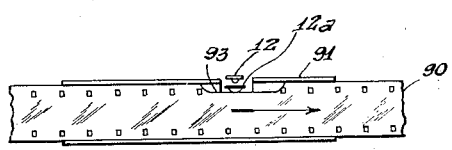
Figure 7 is a plan view of a fragment of the film showing a notch in the side of the film by means of which the device is caused to stop. This view is taken through 7—7 of Figure 6.
Figure 8:
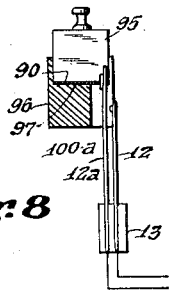
Figure 8 is a section along line 8—8 of Figure 6 showing the circuit breaking switch in elevation.

In Figure 6 the motor 15 is provided with a pulley 81 which drives the fly wheel 82 mounted on a spindle 83, said spindle carrying a sprocket 84 which propels the film 90, this film being provided with a phonographic sound record. The film passes over the sprocket wheel 84, over the roller 85 through the continuous reel 86 and over the roller 87, thence over the sprocket wheel 84. An electric pick-up 88 reproduces the recorded message, conveying the electrical impulses to an amplifier and reproducer not shown. The physical location of the switch 13 shown in Figure 1 will be noted in Figure 6. This switch is caused to open by a notch 93 in the film 90 shown in Figure 7. The spring member 12a entering the notch 93 separates from 12 causing the switch 13 to open, thus stopping the motor. The notch 93 is placed between the end and the beginning of the message on the continuous film 90. It will thus be seen that whether or not the subject leaves the sensitized area and whether or not the solenoid 2 is open or closed, the message once begun will continue to its end where the entrance of spring member 12a into notch 93 opens switch 13, thus discontinuing the operation of the device. The momentum of the fly wheel 82 will carry the notch beyond the switch, thus closing 13 again, but, during the period while switch 13 is open, solenoid 10 releases and opens the motor circuit by breaking contact between 8 and 12.

Figure 9:
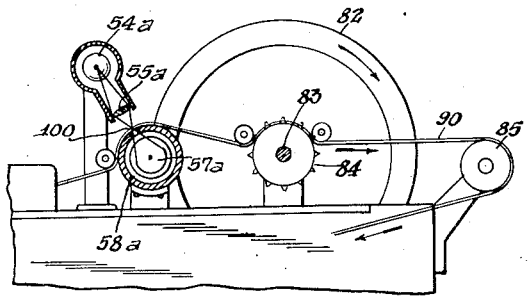
Figure 9 is a sectional side view of one embodiment of our device employing sound recorded photo-electrically on a film and reproduced with a photo-electric cell.

In Figure 9 the fly wheel 82 driven by the motor 15 (not shown) rotates the spindle 83 carrying the sprocket 84, thus propelling the film 90 which carries a photographic sound message past the slot 100 into which is focused a light beam from the exciter lamp 54a through the lens 55a and onto a photo-cell 57a, the electric variations of which cell are conducted to the grid of a tube in an audio amplifier and reproducing circuit (not shown). A switch 13, not shown in Figure 9, operates to stop the device at the end of the message in a manner identical to that described with respect to Figure 6.

Figure 10:
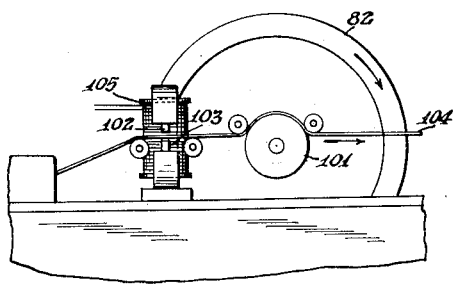
Figure 10 is a fragmentary view of one embodiment of our device employing sound recorded magnetically on a steel tape.

In Figure 10 is shown a magnetic tape 104 propelled by roller 101 driven by the spindle which carries the fly wheel 82 which in turn is propelled by the motor 15 not shown in Figure 10. The magnetic tape passes between the ends of two soft iron cores 102 and 103 on which are wound two coils, the coil on the soft iron core 102 being shown at 105 and the coil on the core 103 not being shown. A voltage is generated in these coils according to the message on the tape and this voltage is impressed on the grid of an audio amplifier tube in the conventional manner. By means of an amplifier and loud speaker this message is made audible.

Figure 11:
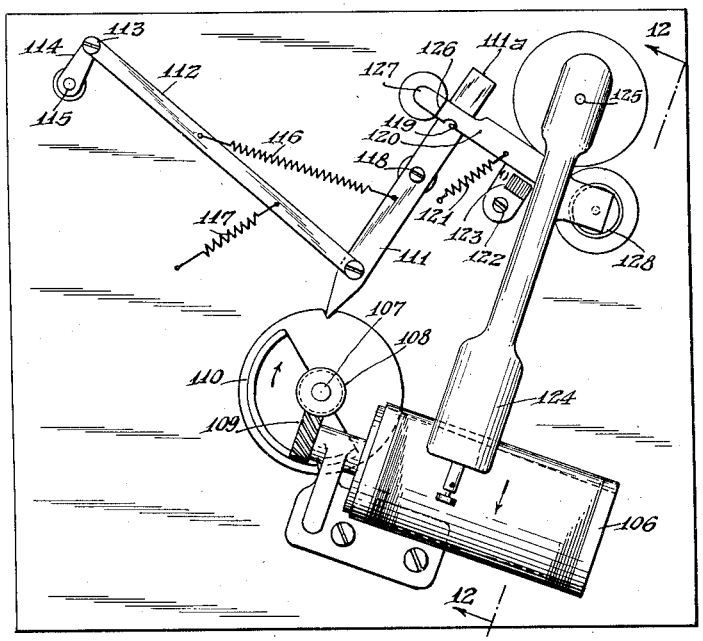
Figure 11 is a top view of the mechanism we employ when using that embodiment of our device which reproduces a message recorded on a cylinder record.

In Figure 11 a cylinder 106 carries a phonographic record which is reproduced by an electrical pick-up mounted in the end of tone arm 124 pivoted at its rear end at 125. The cylinder 106 is caused to rotate by a worm gear 109 meshing with worm gear 108 attached to a spindle 107 which is driven by the motor 15 (not shown). The spindle 107 also carries a semi-circular member 110 which rotates with the spindle. A member 111 is pivoted at 118 and is provided with a pin 119 which fits in a notch in member 120. Member 111 is pointed at one end, the point ordinarily resting just outside the path of travel of the member 110. When the pick-up needle, however, has been carried to the end of the cylinder nearest to spindle 107 a projection (not shown) underneath the tone arm 124 strikes against the member 123, pivoted at 122, causing member 123 to rotate through a small angle. In so rotating the member 123 pushes against member 120 causing it to move away from 118 and its notch releases the pin 119. Tension in the spring 116 tends to diminish the angle between the member 111 and 112. Member 112 is pivoted to member 111 and to member 114 at 113. Member 14 is pivoted at 115. The spring tensions are so arranged that when the pin 119 is released the pointed end of member 111 moves slightly to the right and comes within the path of rotation of semi-circular rotating member 110 which member forces the pointed end of member 111 farther to the right and causes the opposite end 111A to move to the left and lift the end of member 120. Member 120 is bent downward along the line 126 forming a cam surface so that the movement of the end 111A to the left member 111 engages the cam surface and raises the member 120 causing it to slope downward from 126 to a point under the tone arm 124. As member 120 is raised it engages a roller (not shown) attached to the under side of the tone arm and the tone arm is thereby elevated above the cylinder 106. As soon as the pick-up is free of cylinder 106, the tone arm moves to the right by reason of the roller engaging the inclined surface of member 120. When the tone arm reaches the right-hand position it engages a dash pot arrangement 128 which serves to gradually lower the arm into engagement with the cylinder 106. The dash pot arrangement is so constructed that while the arm is being lowered, the air pressure in the dash pot serves to raise a disk 129, see Figure 12 into engagement with a roller 130 carried by switch member 12a and to thereby open the switch 13, thus stopping the motor and leaving the device set at the beginning of a message and ready to operate for the next person who approaches the predetermined position with respect to the machine. After the pick-up settles down by forcing the air out of the dash pot, switch 13 closes again, but not until after solenoid 10 has released and opened the motor circuit at contact 8—12.

Figure 12:
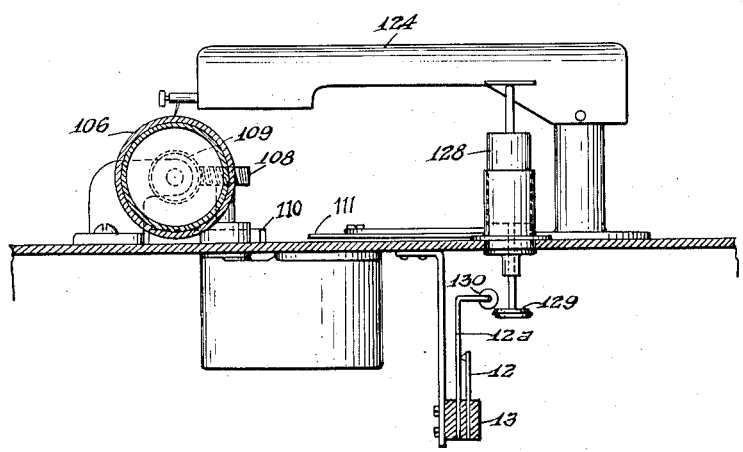
Figure 12 is a sectional view along line 12—12 of Figure 11.

Figure 12 is a view along line 12—12 of Figure 11 showing the manner in which the rising of the disk 129 forces the roller 130 to the left and opens the switch 13, thereby cutting the curent from the motor and causing the device to discontinue operation.

In Figure 13, 131 is a door which opens into the hollow cavity of a robot. Shelves in this cavity are provided for housing the equipment, the aerial 21 being attached to the outside of the figure. If preferred, an exciter lamp (not shown) may have a beam focused on a hole through the robot to shine on a photo-cell within, as previously described. By locating the speaker 18 within the head of the figure the spoken message may be made to appear to come from the lips of the robot. This illusion is heightened by causing a solenoid 132 (Fig. 14) to operate the lips which are made movable with respect to the body of the robot. The solenoid is energized by the output energy of the amplifier, the louder surges of the message causing the larger movement of the lips.

What we claim is:

1. In an advertising device, a lure comprising a robot having movable lips, sound producing apparatus including a sound record carrying an advertising message, a sound reproducer located in said robot, electric means for operating the lips of said robot, means responsive to the approach of an object near said robot for initiating the operation of said sound producing apparatus, and circuits for energizing said sound producing means and said lip operating means from said sound producing apparatus whereby the movable lips of said robot are operated in synchronism with the advertising message.

2. An advertising device according to claim 1 wherein the message delivering means comprises a film having a message recorded in a groove thereon and a stylus for reproducing the same.

3. An advertising device according to claim 1, wherein the message delivering means comprises a film having a message photographically recorded thereon, and a photo-cell arrangement for reproducing said message from said film.

4. An advertising device according to claim 1 in which the message delivering means comprises a magnetic tape carrying a magnetic sound record.

5. In an advertising device, a lure comprising a casing resembling the configuration of a human being, sound reproducing means enclosed within said casing and including a sound record comprising an endless film having an advertising message recorded thereon, and means responsive to the approach of a conducting body near said lure for initiating the operation of said sound reproducing means.

6. In combination, a lure comprising a casing resembling the configuration of a human being, sound reproducing means enclosed in said lure and including a sound record having an advertising message recorded thereon, a capacity sensitive relay arranged within said lure for initiating the operation of said sound reproducing means, said relay including a metallic belt surrounding said lure and forming the capacity sensitive element thereof.

7. In combination, a lure comprising a casing having sound reproducing means enclosed therein including an endless film having a sound record thereon, means for driving said film, means responsive to the approach of an object near said lure for initiating the operation of said driving means, means controlled by said film for maintaining said driving means energized independently of said initiating means, and means for rendering said last named means inoperative upon the completion of one cycle of operation of said film.

8. In combination, a lure comprising a casing having sound reproducing means enclosed therein including an endless film having a sound record thereon, electric means for driving said film, a switch for initiating the operation of said driving means, means responsive to the approach of an object near said lure for closing said switch to initiate the operation of said driving means, a second switch arranged to maintain said driving means energized independently of said first switch, means engaging the edge of said film for maintaining said second switch in closed position, said film having a notch formed in the edge thereof for opening said second switch upon the operation of said film through a predetermined cycle.

DAVID ALBERT WEIS.
WILLIAM L. WOOLF.